US012567744B2

(12) United States Patent
Xiao et al.

(10) Patent No.: US 12,567,744 B2
(45) Date of Patent: Mar. 3, 2026

(54) GRID-FORMING CONTROL METHOD FOR OFFSHORE WIND TURBINE

(71) Applicants: South China University of Technology, Guangzhou (CN); Electric Power Research Institute of China Southern Power Grid Co., Ltd., Guangzhou (CN)

(72) Inventors: Huangqing Xiao, Guangzhou (CN); Xiaowei Huang, Guangzhou (CN); Yan Li, Guangzhou (CN); Weihuang Huang, Guangzhou (CN); Dongxiao Cai, Guangzhou (CN); Faxi Peng, Guangzhou (CN)

(73) Assignee: South China University of Technology & Electric Power Research Institute of China Southern Power Grid Co., Ltd., Guangzhou (CN)

( * ) Notice: Subject to any disclaimer, the term of this patent is extended or adjusted under 35 U.S.C. 154(b) by 387 days.

(21) Appl. No.: 18/144,343

(22) Filed: May 8, 2023

(65) Prior Publication Data

US 2023/0361570 A1 Nov. 9, 2023

(30) Foreign Application Priority Data

May 7, 2022 (CN) .......................... 202210498005.6

(51) Int. Cl.
*H02J 3/24* (2006.01)
*H02J 3/36* (2006.01)

(52) U.S. Cl.
CPC *H02J 3/24* (2013.01); *H02J 3/36* (2013.01); *H02J 2300/28* (2020.01)

(58) Field of Classification Search
CPC ............. H02J 3/24; H02J 3/36; H02J 2300/28
(Continued)

(56) References Cited

U.S. PATENT DOCUMENTS 11,641,109 B2 * 5/2023 Zhang ................. H02M 7/4835
700/287
2013/0010505 A1 * 1/2013 Bo ........................... H02J 3/44
363/37

(Continued)

*Primary Examiner* — Md Azad
(74) *Attorney, Agent, or Firm* — The Dobrusin Law Firm, P.C.

(57) ABSTRACT

Disclosed is grid-forming control method for an offshore wind turbine, including the following steps: obtaining a grid voltage and current at a grid connection point of a wind turbine, actual values of active power and reactive power of the wind turbine, and references of the active power, the reactive power and an voltage amplitude; calculating a phase reference of a grid-side converter of the wind turbine; calculating a reference of a modulating voltage at the grid-side converter of the wind turbine in a dq rotating coordinate system; and calculating a reference of a modulating voltage at the grid-side converter in an abc static coordinate system according to the phase reference of the grid-side converter of the wind turbine and the reference of the modulating voltage in the dq rotating coordinate system. The present disclosure can control the voltage amplitude of the grid connection point by the active power of the wind turbine, and can control the voltage frequency at the grid connection point by the reactive power of the wind turbine. Furthermore, the wind turbine controlled by the present disclosure can be kept in reliable synchronous running under conditions of startup, power fluctuation, alternating current (AC) fault and the like.

6 Claims, 2 Drawing Sheets

(58) Field of Classification Search
USPC .......................................................... 700/287
See application file for complete search history.

(56) References Cited

U.S. PATENT DOCUMENTS

| | | | |
|---|---|---|---|
| 2014/0008912 A1* | 1/2014 | Gupta | H02J 3/48 |
| | | | 290/44 |
| 2021/0140407 A1* | 5/2021 | Gao | H02J 3/16 |
| 2022/0271685 A1* | 8/2022 | Cai | H02M 1/12 |

* cited by examiner

GRID-FORMING CONTROL METHOD FOR OFFSHORE WIND TURBINE

FIELD OF THE INVENTION

The present disclosure relates to the field of control technologies of wind turbines, specifically to a grid-forming control method for an offshore wind turbine.

BACKGROUND OF THE INVENTION

Long-distance offshore wind power needs to be integrated into an onshore grid by using high voltage direct current (HVDC) transmission. With the continuous increase of a transmission capacity, the volume and weight of key equipment of an offshore converter station will increase, and the difficulty of mounting, transportation, operation and maintenance of the key equipment will also increase. This will cause huge economic and technical challenges to the overall construction of an offshore wind power grid-connected system. One solution to the above problems is to use a diode rectifier (DR) in the offshore converter station. Compared with the modular multilevel converter (MMC), the DR has a volume that is one fifth of that of the MMC and has a weight that is one third of that of the MMC. In addition, the DR-based HVDC solution has the advantages of high reliability and low maintenance cost.

However, the DR is an uncontrollable converter, which cannot provide a stable voltage support for offshore wind turbines like the MMC. Therefore, the offshore wind turbines need to adopt grid-forming control to establish a stable alternating current (AC) voltage.

SUMMARY OF THE INVENTION

The present disclosure aims to solve the above defects in the related technology, and provides a grid-forming control method for an offshore wind turbine. The control method can control an amplitude value of a voltage of a grid connection point by using active power of the wind turbine, and can control a frequency of the voltage of the grid connection point by using reactive power of the wind turbine, so that the wind turbine can be kept in synchronous running in a start-up process, a power disturbance process and after an AC fault.

The objective of the present disclosure can be achieved by adopting the following technical solution.

A grid-forming control method for an offshore wind turbine is provided, including the following steps:

S1, obtaining a voltage and current at a grid connection point of a wind turbine, performing dq decomposition on the voltage and current at the grid connection point of the wind turbine to separately obtain d-axis components and q-axis components of the grid voltage and current at the grid connection point in a dq rotating coordinate system, obtaining actual values of active power, reactive power and voltage frequency at the grid connection point of the wind turbine, and obtaining references of active power, reactive power and voltage amplitude at the grid connection point of the wind turbine;

S2, calculating a phase reference of a grid-side converter of wind turbine;

S3, calculating a d-axis voltage reference of the grid connection point of the wind turbine;

S4, calculating a d-axis current reference and q-axis current reference of the grid connection point of the wind turbine;

S5, calculating a d-axis voltage reference and q-axis voltage reference of a modulating voltage of the grid-side converter of the wind turbine;

S6, calculating an a-axis, b-axis and c-axis reference of the modulating voltage in the abc static coordinate system of the grid-side converter of wind turbine;

S7, generating, according to the references of the modulating voltages, a corresponding control pulse by using a pulse width modulation theory, to control the grid-side converter of the offshore wind turbine.

Further, a calculation formula for the phase reference $\theta^*$ of the grid-side converter of the wind turbine is as follows:

$$\theta^* = \frac{\omega_{base}}{s}\left[\omega + \frac{K_G}{1+sK_T}(Q - Q_{ref})\right]$$

where s is a Laplace operator; $\omega_{base}$ base is a basic frequency of an AC system; $\omega$ is the actual value of voltage frequency at the grid connection point; $K_G$ and $K_T$ are a proportion parameter and time parameter of a first-order inertial controller respectively; Q is the actual value of the reactive power of the wind turbine; and $Q_{ref}$ is the reference of the reactive power of the wind turbine. By the above control, the frequency of offshore AC system and the phase reference of the grid-side converter of the wind turbine can be actively controlled by the reactive power of the wind turbine.

Further, a calculation formula for the d-axis voltage reference $U_d^*$ of the grid connection point of the wind turbine is as follows:

$$U_d^* = U_{d0} + \left(K_P + \frac{K_I}{s}\right)(P_{ref} - P)$$

where $U_{d0}$ is the reference of the voltage amplitude at the grid connection point of the wind turbine; $K_P$ and $K_I$ are a proportion parameter and integral parameter of an active power PI controller respectively; s is a Laplace operator; and $P_{ref}$ and P are the reference and actual value of the active power of the wind turbine, respectively. By the above control, the voltage amplitude of the grid connection point of wind turbine can be actively controlled by the active power of the wind turbine.

Further, calculation formulas for the d-axis current reference $I_d^*$ and the q-axis current reference $I_q^*$ of the grid connection point of the wind turbine are as follows:

$$\begin{cases} I_d^* = -\omega C_F U_q + \left(K_{PV} + \frac{K_{IV}}{s}\right)(U_d - U_d^*) \\ I_q^* = \omega C_F U_d + \left(K_{PV} + \frac{K_{IV}}{s}\right)U_q \end{cases}$$

where $U_d$ and $U_q$ are a d-axis component and a q-axis component of the voltage at the grid connection point of the wind turbine in the dq rotating coordinate system, respectively; s is a Laplace operator; $\omega$ is the actual value of the voltage frequency of at the grid connection point; $U_d^*$ is the d-axis voltage reference of the grid connection point of the wind turbine; CF is a capacitance value of the AC side LC filter of the grid-side converter of the wind turbine; and $K_{PV}$ and $K_{IV}$ are a proportion parameter and integral parameter of the voltage controller, respectively. By the above control, the wind turbine can present a voltage source characteristic, which is a requirement for grid-forming control.

Further, calculation formulas for the d-axis voltage reference $V_d^*$ and the q-axis voltage reference $V_q^*$ of the modulating voltage of the grid-side converter of the wind turbine are as follows:

$$\begin{cases} V_d^* = U_d - \omega L_F I_q + \left(K_{PC} + \dfrac{K_{IC}}{s}\right)(I_d^* - I_d) \\ V_q^* = U_q + \omega L_F I_d + \left(K_{PC} + \dfrac{K_{IC}}{s}\right)(I_q^* - I_q) \end{cases}$$

where $I_d$ and $I_q$ are a d-axis component and q-axis component of the current at the grid connection point of the wind turbine in the dq rotating coordinate system, respectively; $L_F$ is an inductance value of the AC side LC filter of the grid-side converter of the wind turbine; $K_{PC}$ and $K_{IC}$ are a proportion parameter and integral parameter of a current controller, respectively; s is a Laplace operator; $\omega$ is the actual value of the voltage frequency at the grid connection point; and $I_d^*$ and $I_q^*$ are the d-axis current reference and the q-axis current reference of the grid connection point of the wind turbine, respectively. By the above control, the current can be quickly adjusted and amplitude-limited to avoid an overcurrent generated by the converter from damaging equipment.

Further, in the step S6, calculation formulas for the a-axis voltage reference $V_a^*$, the b-axis voltage reference $V_b^*$ and the c-axis voltage reference $V_c^*$ of the modulating voltage of the grid-side converter of the wind turbine in the abc static coordinating system are as follows:

$$\begin{cases} V_a^* = V_d^* \cos\theta^* - V_q^* \sin\theta^* \\ V_b^* = V_d^* \cos\left(\theta^* - \dfrac{2\pi}{3}\right) - V_q^* \sin\left(\theta^* - \dfrac{2\pi}{3}\right) \\ V_c^* = V_d^* \cos\left(\theta^* + \dfrac{2\pi}{3}\right) - V_q^* \sin\left(\theta^* + \dfrac{2\pi}{3}\right) \end{cases}$$

where $\theta^*$ is the phase reference of the grid-side converter of the wind turbine; and $V_d^*$ and $V_q^*$ are the d-axis voltage reference and the q-axis voltage reference of the modulating voltage of the grid-side converter of the wind turbine, respectively. Because a final control signal required by the grid-side converter of the wind turbine is a voltage modulated wave in the abc static coordinate system, it is necessary to convert the d-axis voltage reference and the q-axis voltage reference of the modulating voltage to the abc static coordinate system.

Further, after the a-axis voltage reference, the b-axis voltage reference, and the c-axis voltage reference of the modulating voltage in the abc static coordinate system are obtained, it is possible to generate control pulses corresponding to various Insulated Gate Bipolar Transistors (IGBTs) of the grid-side converter using the commonly used pulse width modulation theory, thereby controlling the grid-side converter of the offshore wind turbine.

The present disclosure has the following advantages and effects compared to the prior technique:

(1) The present disclosure can control the voltage amplitude at the grid connection point by the active power of the wind turbine, and can control the voltage frequency at the grid connection point by the reactive power of the wind turbine, so that the wind turbine can present a voltage source characteristic, to achieve the objective of grid-forming control.

(2) The control method of the present disclosure is applicable to all causes of startup, steady-state operation and fault operation of the wind turbine. Through theoretical analysis and simulation examples, it is verified that the wind turbine using the control method of the present disclosure can be kept in reliable synchronous running under conditions of startup, power fluctuation, AC fault and the like.

BRIEF DESCRIPTION OF THE DRAWINGS

Drawings described herein are used for providing further understandings of the present disclosure, and constitute one part of this application. Illustrative embodiments and descriptions thereof of the present disclosure are used for explaining the present disclosure, and do not constitute an improper limitation to the present disclosure. In the drawings.

DETAILED DESCRIPTION OF THE EMBODIMENTS

In order to make the objectives, technical solutions and advantages of the embodiments of the present disclosure clearer, the technical solutions in the embodiments of the present disclosure will be described clearly and completely below in combination with the drawings in the embodiments of the present disclosure. Obviously, the embodiments described herein are part of the embodiments of the present disclosure, not all the embodiments. All other embodiments obtained by those of ordinary skill in the art based on the embodiments in the present disclosure without creative work shall fall within the protection scope of the present disclosure.

Embodiment 1

Figure 1:
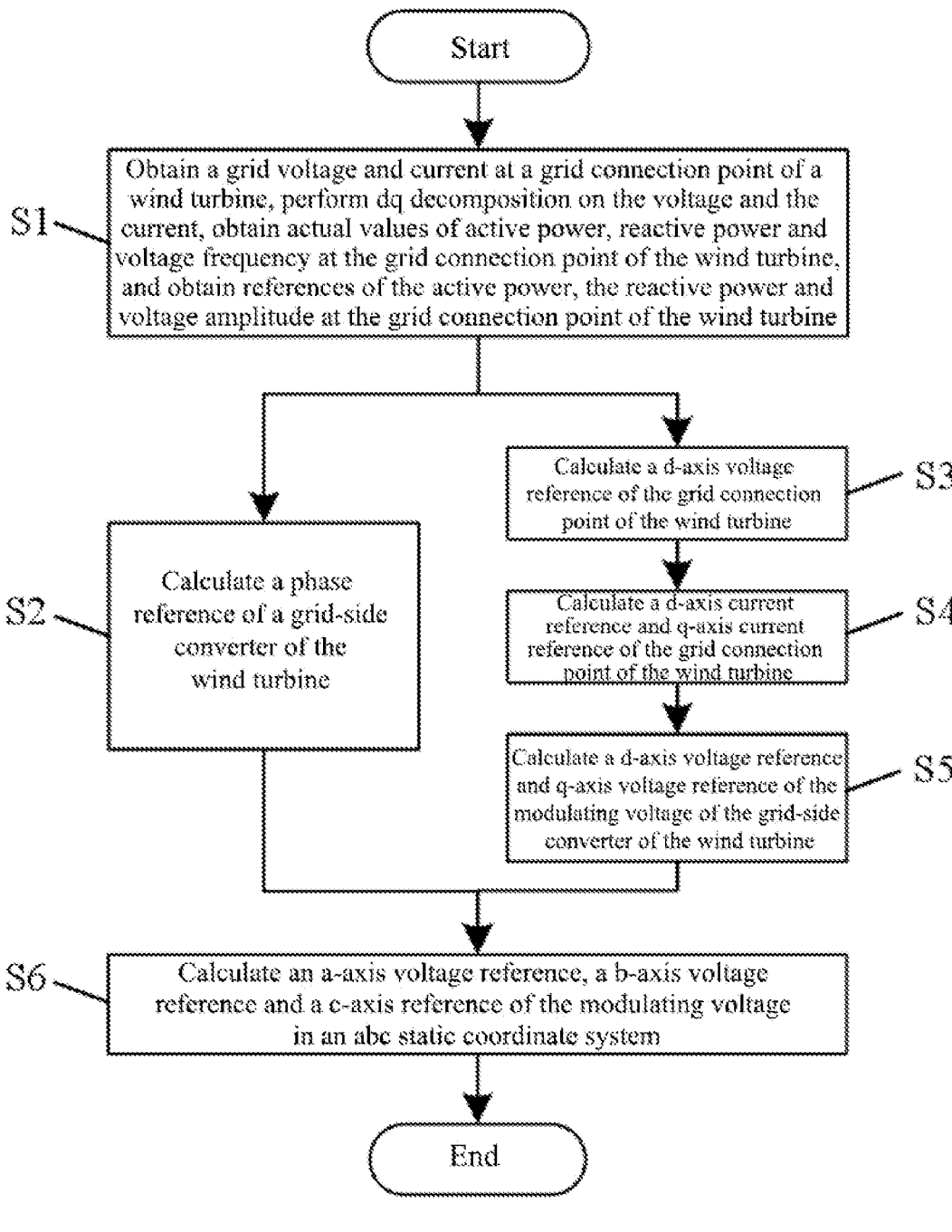
FIG. 1 is a flowchart of a grid-forming control method for an offshore wind turbine disclosed in the present disclosure.

Referring to FIG. 1, this embodiment discloses a grid-forming control method for an offshore wind turbine, including the following steps:

At S1, a grid voltage and current at a grid connection point of a wind turbine are obtained; dq decomposition is performed on the grid voltage and current at the grid connection point of the wind turbine to separately obtain d-axis components and q-axis components of the grid voltage and current at the grid connection point in a dq rotating coordinate system; actual values of active power, reactive power and voltage frequency at the grid connection point of the wind turbine are obtained; and references of the active power, the reactive power and the voltage amplitude at the grid connection point of the wind turbine are obtained.

At S2, a phase reference of a grid-side converter of the wind turbine is calculated.

A calculation formula for the phase reference $\theta^*$ of the grid-side converter of the wind turbine is as follows:

$$\theta^* = \frac{\omega_{base}}{s}\left[\omega + \frac{K_G}{1 + sK_T}(Q - Q_{ref})\right]$$

where s is a Laplace operator; $\omega_{base}$ is a basic frequency of an AC system; $\omega$ is the actual value of the voltage frequency at the grid connection point; $K_G$ and $K_T$ are a proportion parameter and time parameter of a first-order inertial controller, respectively; Q is the actual value of the reactive power of the wind turbine; and $Q_{ref}$ is the reference of the reactive power of the wind turbine.

At S3, a d-axis voltage reference of the grid connection point of the wind turbine is calculated.

A calculation formula for the d-axis voltage reference $U_d^*$ of the grid connection point of the wind turbine is as follows:

$$U_d^* = U_{d0} + \left(K_P + \frac{K_I}{s}\right)(P_{ref} - P)$$

where $U_{d0}$ is the reference of the voltage amplitude at the grid connection point of the wind turbine; $K_P$ and $K_I$ are a proportion parameter and integral parameter of an active power PI controller respectively; s is a Laplace operator; and $P_{ref}$ and P are the reference and actual value of the active power of the wind turbine, respectively.

At S4, a d-axis current reference and a q-axis current reference of the grid connection point of the wind turbine are calculated.

Calculation formulas for the d-axis current reference $I_d^*$ and the q-axis current reference $I_q^*$ of the grid connection point of the wind turbine are as follows:

$$\begin{cases} I_d^* = -\omega C_F U_q + \left(K_{PV} + \frac{K_{IV}}{s}\right)(U_d - U_d^*) \\ I_q^* = \omega C_F U_d + \left(K_{PV} + \frac{K_{IV}}{s}\right)U_q \end{cases}$$

where $U_d$ and $U_q$ are a d-axis component and q-axis component of the voltage at the grid connection point of the wind turbine in the dq rotating coordinate system, respectively; s is a Laplace operator; $\omega$ is the actual value of the voltage frequency at the grid connection point; $U_d^*$ is the d-axis voltage reference of the grid connection point of the wind turbine; $C_F$ is a capacitance value of AC side LC filter of the grid-side converter of the wind turbine; and $K_{PV}$ and $K_{IV}$ are a proportion parameter and integral parameter of a voltage controller, respectively.

At S5, a d-axis voltage reference and q-axis voltage reference of a modulating voltage of the grid-side converter of the wind turbine are calculated.

Calculation formulas for the d-axis voltage reference $V_d^*$ and the q-axis voltage reference $V_q^*$ of the modulating voltage of the grid-side converter of the wind turbine are as follows:

$$\begin{cases} V_d^* = U_d - \omega L_F I_q + \left(K_{PC} + \frac{K_{IC}}{s}\right)(I_d^* - I_d) \\ V_q^* = U_q + \omega L_F I_d + \left(K_{PC} + \frac{K_{IC}}{s}\right)(I_q^* - I_q) \end{cases}$$

where $I_d$ and $I_q$ are a d-axis component and q-axis component of the current at the grid connection point of the wind turbine in the dq rotating coordinate system, respectively; $L_F$ is an inductance value of the AC side LC filter of the grid-side converter of the wind turbine; $K_{PC}$ and $K_{IC}$ are a proportion parameter and integral parameter of a current controller, respectively; s is a Laplace operator; $\omega$ is the actual value of the voltage frequency at the grid connection point; and $I_d^*$ and $I_q^*$ are the d-axis current reference and the q-axis current reference of the grid connection point of the wind turbine, respectively.

At S6, an a-axis voltage reference, a b-axis voltage reference and a c-axis reference of the modulating voltage in an abc static coordinate system of the grid-side converter of the wind turbine are calculated.

At S7, a corresponding control pulse is generated generating according to the references of the modulating voltages by using a pulse width modulation theory, to control the grid-side converter of the offshore wind turbine.

Calculation formulas for the a-axis voltage reference $V_a^*$, the b-axis voltage reference $V_b^*$ and the c-axis voltage reference $V_c^*$ of the modulating voltage of the grid-side converter of the wind turbine in the abc static coordinating system are as follows:

$$\begin{cases} V_a^* = V_d^* \cos\theta^* - V_q^* \sin\theta^* \\ V_b^* = V_d^* \cos\left(\theta^* - \frac{2\pi}{3}\right) - V_q^* \sin\left(\theta^* - \frac{2\pi}{3}\right) \\ V_c^* = V_d^* \cos\left(\theta^* + \frac{2\pi}{3}\right) - V_q^* \sin\left(\theta^* + \frac{2\pi}{3}\right) \end{cases}$$

where $\theta^*$ is the phase reference of the grid-side converter of the wind turbine; and $V_d^*$ and $V_q^*$ are the d-axis voltage reference and the q-axis voltage reference of the modulating voltage of the grid-side converter of the wind turbine, respectively.

Embodiment 2

Figure 2:
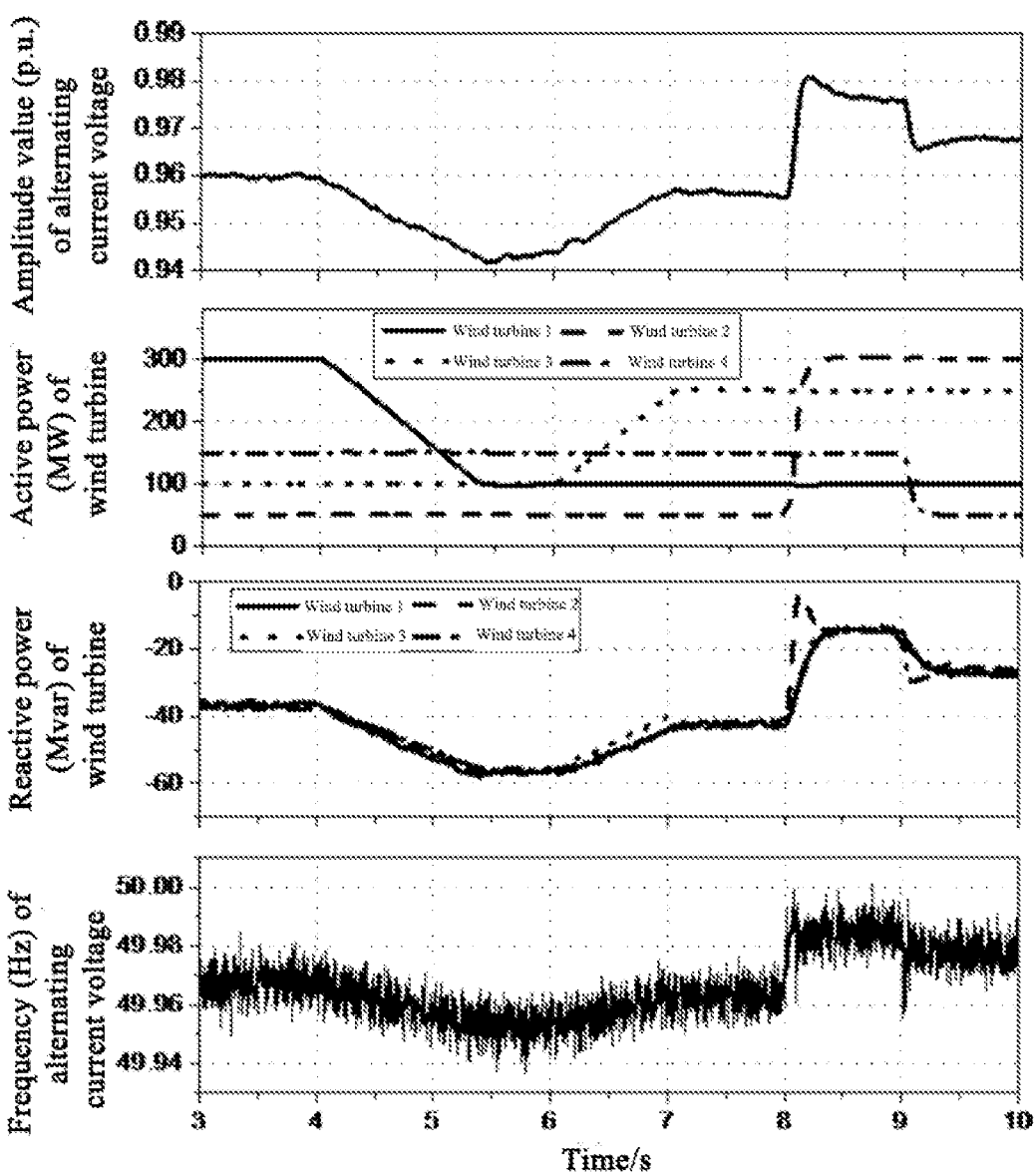
FIG. 2 is a schematic diagram of a simulation waveform of a power fluctuation in a case of using the grid-forming control method of the present disclosure.

Based on the grid-forming control method for an offshore wind turbine disclosed in Embodiment 1, this embodiment performs simulation verification using a test system including four offshore wind turbines. All the wind turbines adopt grid-forming control referred to in the present disclosure. It is assumed that the active powers generated by wind turbines 1, 2, 3, and 4 in steady states are 300 MW, 150 MW, 100 MW, and 50 MW, respectively. System characteristics with linear and step changes in the active powers of the wind turbines are as shown in FIG. 2. At time t=4.0 s, the power of wind turbine 1 linearly decreases from 300 MW to 100 MW, with a change rate of 150 MW/s. At time t=6.0 s, the power of wind turbine 3 linearly decreases from 100 MW to 250 MW, with a change rate of 150 MW/s. At time t=8.0 s, the power of wind turbine 4 steps up from 50 MW to 300 MW. At time t=9.0 s, the power of wind turbine 2 steps down from 150 MW to 50 MW. As can be seen from the simulation FIG. 2, when the wind turbine has linear and step changes in the active power, the system can well track the change of the reference of the active power and reach a stable running state in very short time.

The above embodiments are preferred implementations of the present disclosure, but the implementations of the present disclosure are not limited by the above embodiments, and any other changes, modifications, substitutions, combinations, and simplifications that are made without departing from the spirit essence and principle of the present disclosure shall all be equivalent replacement methods, which all fall within the protection scope of the present disclosure.

The invention claimed is:

1. A grid-forming control method for an offshore wind turbine, performed by a grid-forming system, wherein the grid-forming system is part of or in communication with the offshore wind turbine, and wherein the grid-forming control method comprises the following steps:

S1, obtaining a grid voltage and a current at a grid connection point of the offshore wind turbine, performing a dq decomposition on the grid voltage and the current at the grid connection point of the offshore wind turbine to separately obtain d-axis components and q-axis components of the grid voltage and the current at the grid connection point in a dq rotating coordinate system, obtaining actual values of active power, reactive power, and voltage frequency at the grid connection point of the offshore wind turbine, and obtaining references of the active power, the reactive power and the voltage amplitude at the grid connection point of the offshore wind turbine;

S2, calculating a phase reference of a grid-side converter of the offshore wind turbine;

S3, calculating a d-axis voltage reference-of the grid connection point of the offshore wind turbine;

S4, calculating a d-axis current reference and a q-axis current reference of the grid connection point of the offshore wind turbine;

S5, calculating a d-axis voltage reference and a q-axis voltage reference of a modulating voltage of the grid-side converter of the offshore wind turbine;

S6, calculating an a-axis voltage reference, a b-axis voltage reference, and a c-axis reference of the modulating voltage in an abc static coordinate system of the grid-side converter of the offshore wind turbine; and S7, generating, according to the references of the modulating voltages, a corresponding control pulse for each Insulated Gate Bipolar Transistor of the grid-side converter by pulse width modulation, to control the grid-side converter of the offshore wind turbine, thereby establishing a stable alternating current voltage for the offshore wind turbine and controlling the offshore wind turbine to keep synchronous running under conditions of startup, power fluctuations, or alternating current fault.

2. The grid-forming control method for the offshore wind turbine according to claim 1, wherein in the step S2, a calculation formula for the phase reference, $\theta^*$, of the grid-side converter of the offshore wind turbine is as follows:

$$\theta^* = \frac{\omega_{base}}{s}\left[\omega + \frac{K_G}{1 + sK_T}(Q - Q_{ref})\right]$$

where s is a Laplace operator; $\omega_{base}$ is a basic frequency of an AC system; $\omega$ is the actual value of the voltage frequency at the grid connection point; $K_G$ and $K_T$ are a proportion parameter and time parameter of a first-order inertial controller, respectively; Q is the actual value of the reactive power of the offshore wind turbine; and $Q_{ref}$ is the reference of the reactive power of the offshore wind turbine.

3. The grid-forming control method for the offshore wind turbine according to claim 1, wherein in the step S3, a calculation formula for the d-axis voltage reference, $U_d^*$, of the grid connection point of the offshore wind turbine is as follows:

$$U_d^* = U_{d0} + \left(K_P + \frac{K_I}{s}\right)(P_{ref} - P)$$

where $U_{d0}$ is the reference of the voltage amplitude at the grid connection point of the offshore wind turbine; $K_P$ and $K_I$ are a proportion parameter and an integral parameter of an active power PI controller, respectively; s is a Laplace operator; and $P_{ref}$ and P are the reference and the actual value of the active power of the offshore wind turbine, respectively.

4. The grid-forming control method for the offshore wind turbine according to claim 1, wherein in the step S4, calculation formulas for the d-axis current reference, $I_d^*$, and the q-axis current reference, $I_q^*$, of the grid connection point of the offshore wind turbine are as follows:

$$\begin{cases} I_d^* = -\omega C_F U_q + \left(K_{PV} + \frac{K_{IV}}{s}\right)(U_d - U_d^*) \\ I_q^* = \omega C_F U_d + \left(K_{PV} + \frac{K_{IV}}{s}\right)U_q \end{cases}$$

where $U_d$ and $U_q$ are a d-axis component and a q-axis component of the voltage at the grid connection point of the offshore wind turbine in the dq rotating coordinate system, respectively; s is a Laplace operator; $\omega$ is the actual value of the voltage frequency at the grid connection point; $U_d^*$ is the d-axis voltage reference of the grid connection point of the offshore wind turbine; $C_F$ is a capacitance value of an AC side LC filter of the grid-side converter of the offshore wind turbine; and $K_{PV}$ and $K_{IV}$ are a proportion parameter and an integral parameter of a voltage controller, respectively.

5. The grid-forming control method for the offshore wind turbine according to claim 1, wherein in the step S5, calculation formulas for the d-axis voltage reference, $V_d^*$, and the q-axis voltage reference, $V_q^*$, of the modulating voltage of the grid-side converter of the offshore wind turbine are as follows:

$$\begin{cases} V_d^* = U_d - \omega L_F I_q + \left(K_{PC} + \frac{K_{IC}}{s}\right)(I_d^* - I_d) \\ V_q^* = U_q + \omega L_F I_d + \left(K_{PC} + \frac{K_{IC}}{s}\right)(I_q^* - I_q) \end{cases}$$

where $I_d$ and $I_q$ are a d-axis component and a q-axis component of the current at the grid connection point of the offshore wind turbine in the dq rotating coordinate system, respectively; $L_F$ is an inductance value of the AC side LC filter of the grid-side converter of the offshore wind turbine; $K_{PC}$ and $K_{IC}$ are a proportion parameter and integral parameter of a current controller, respectively; s is a Laplace operator; $\omega$ is the actual value of the voltage frequency at the grid connection point; and $I_d^*$ and $I_q^*$ are the d-axis current reference and the q-axis current reference of the grid connection point of the offshore wind turbine, respectively.

6. The grid-forming control method for the offshore wind turbine according to claim 1, wherein in the step S6, calculation formulas for the a-axis voltage reference, $V_a^*$, the b-axis voltage reference, $V_b^*$, and the c-axis voltage reference, $V_c^*$, of the modulating voltage of the grid-side converter of the offshore wind turbine in the abc static coordinating system are as follows:

$$\begin{cases} V_a^* = V_d^* \cos\theta^* - V_q^* \sin\theta^* \\ V_b^* = V_d^* \cos\left(\theta^* - \dfrac{2\pi}{3}\right) - V_q^* \sin\left(\theta^* - \dfrac{2\pi}{3}\right) \\ V_c^* = V_d^* \cos\left(\theta^* + \dfrac{2\pi}{3}\right) - V_q^* \sin\left(\theta^* + \dfrac{2\pi}{3}\right) \end{cases}$$    5 where $\theta^*$ is the phase reference of the grid-side converter of the offshore wind turbine; and $V_d^*$ and $V_q^*$ are the d-axis voltage reference and the q-axis voltage reference of the modulating voltage of the grid-side converter of the offshore wind turbine, respectively.

\*     \*     \*     \*     \*